United States Patent
Brunswig et al.

(10) Patent No.: US 9,170,826 B2
(45) Date of Patent: Oct. 27, 2015

(54) COMMON MULTI-LANGUAGE TEXT MANAGEMENT IN A BUSINESS-ORIENTED SOFTWARE FRAMEWORK

(71) Applicants: Frank Brunswig, Heidelberg (DE); Frank Jentsch, Muhlhausen (DE); Bare Said, Sankt Leon-Rot (DE)

(72) Inventors: Frank Brunswig, Heidelberg (DE); Frank Jentsch, Muhlhausen (DE); Bare Said, Sankt Leon-Rot (DE)

(73) Assignee: SAP SE, Walldorf (DE)

(*) Notice: Subject to any disclaimer, the term of this patent is extended or adjusted under 35 U.S.C. 154(b) by 228 days.

(21) Appl. No.: 13/717,089

(22) Filed: Dec. 17, 2012

(65) Prior Publication Data
US 2014/0172409 A1    Jun. 19, 2014

(51) Int. Cl.
*G06F 17/28* (2006.01)
*G06F 9/44* (2006.01)

(52) U.S. Cl.
CPC .................... *G06F 9/4448* (2013.01)

(58) Field of Classification Search
CPC ....................................... G06F 17/28
USPC ....................................... 704/2–8
See application file for complete search history.

(56) References Cited

U.S. PATENT DOCUMENTS

| | | | | |
|---|---|---|---|---|
| 5,907,326 A | * | 5/1999 | Atkin et al. | 715/866 |
| 6,092,036 A | * | 7/2000 | Hamann | 704/8 |
| 6,275,978 B1 | * | 8/2001 | Bell | 717/143 |
| 6,429,882 B1 | * | 8/2002 | Abdelnur et al. | 715/763 |
| 6,567,973 B1 | * | 5/2003 | Yamamoto et al. | 717/136 |
| 2004/0167784 A1 | * | 8/2004 | Travieso et al. | 704/270.1 |
| 2010/0100369 A1 | * | 4/2010 | Shetty et al. | 704/4 |

* cited by examiner

*Primary Examiner* — Jesse Pullias
(74) *Attorney, Agent, or Firm* — Mintz Levin Cohn Ferris Glovsky and Popeo, P.C.

(57) ABSTRACT

A system, a method, and a computer-program product for providing multi-language support in applications are disclosed. A first textual expression contained within an application is obtained. The first textual expression is expressed in a first language. A unique key from a hash of the first textual expression is generated. A language code representative of a second language is determined. Based on the generated unique key and the determined language code, a second textual expression in the second language representative of a translation from the first language into the second language indicated by the language code is determined. The second textual expression is provided to the application to replace the first textual expression in a view presented to a user.

20 Claims, 6 Drawing Sheets

| Key | Language Code | Text |
|---|---|---|
| d9b5aab07b3b540f791ba58667a18380 | EN | Sales Order |
| d9b5aab07b3b540f791ba58667a18380 | DE | Verkaufsauftrag |
| d9b5aab07b3b540f791ba58667a18380 | FR | Ordre de vente |
| d9b5aab07b3b540f791ba58667a18380 | ES | Ordenes de venta |

FIG. 2

| Key | Corresponding Text |
|---|---|
| 0b27918290ff5323bea1e3b78a9cf04e | File |
| 47b74b5cb415e0a295404acaa62ff67a | Page Layout |
| 5251010ec9e364492c236bf8b9983928 | File not found |
| d38468f57c322ff0dc5d019ea4efb6df | Protect Document |

FIG. 3

| Key | Language Code | Text |
|---|---|---|
| d9b5aab07b3b540f791ba58667a18380 | EN | Sales Order |
| d9b5aab07b3b540f791ba58667a18380 | DE | Verkaufsauftrag |
| d9b5aab07b3b540f791ba58667a18380 | FR | Ordre de vente |
| d9b5aab07b3b540f791ba58667a18380 | ES | Ordenes de venta |

| Key | Type | Object |
|---|---|---|
| 7dce122004969d56ae2e0245cb754d35 | BUSINESS_OBJECT | SALES_ORDER |
| 7dce122004969d56ae2e0245cb754d35 | UI_COMPONENT | SALES_ORDER_OWL |
| 7dce122004969d56ae2e0245cb754d35 | UI_COMPONENT | SALES_ORDER_OIF |
| 7dce122004969d56ae2e0245cb754d35 | UI_COMPONENT | SALES_ORDER_QAF |

COMMON MULTI-LANGUAGE TEXT MANAGEMENT IN A BUSINESS-ORIENTED SOFTWARE FRAMEWORK

TECHNICAL FIELD

This disclosure relates generally to data processing and, in particular, to providing multi-language support in software applications.

BACKGROUND

Software systems and applications are typically designed using a single default language. In most cases, such single standard language is English. However, for today's software applications, internationalization and localization and, especially, the provisioning and support of different languages may be mandatory. Internationalization and localization can refer to ways of adapting software applications to different languages, regional differences, and/or technical requirements of a particular market. Internationalization refers to a process of designing a software application so that it can be adapted to various languages and regions without engineering changes. Localization refers to a process of adapting internationalized software for a specific region or language by adding locale-specific components and translating text. Many different and sophisticated software engineering approaches have been designed to define, change, translate, and install language-dependent texts for software applications.

Many current software applications do not support reuse of same textual expressions in different user interface components (e.g., labels, captions, titles, push buttons, error messages, etc.) running in different language environments. The current practice, for developers using language-dependent texts, is to search for an already existing text in a particular language and, if the text in that particular language is available, reuse it. If the text in a particular language does not exist, then a developer has to create a new text. This can be accomplished by creating a new entry in a text table or in a text resource file and assign a key to it. This key will then be used to access the language-dependent text at runtime.

However, the current system are deficient in that their creation of new language-dependent text for a particular textual expression can consume development time, produce unnecessary keys, generate significant redundant work for the developer in generating these keys, as well as incur time delay and additional cost.

SUMMARY

In some implementations, the current subject matter relates to a computer implemented method for providing multi-language support in applications. The method includes obtaining a first textual expression contained within an application, wherein the first textual expression is expressed in a first language, generating a unique key from a hash of the first textual expression, determining a language code representative of a second language, determining, based on the generated unique key and the determined language code, a second textual expression in the second language representative of a translation from the first language into the second language indicated by the language code, and providing the second textual expression to the application to replace the first textual expression in a view presented to a user.

In some implementations, the current subject matter can include one or more of the following optional features. The first textual expression can include information presented at a user interface. The determination of the language code can include determining a default language where the application is being executed, and selecting the language code representative of the default language. The determination of the second textual expression can include accessing a table including the generated unique key and the determined language code mapped to the second language expression. The method can also include generating a table including a plurality of unique keys mapped to language codes representing different translations of the first textual expression.

In some implementations, the method can also include accessing an index containing a location where the first textual expression appears in the application. The second textual expression can be placed in the location based on the accessed index. The method can also include updating the index with a new location where the first textual expression is used by the application, and placing the second textual expression in the new location based on the updated index.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 illustrates an exemplary hash value table containing different hash values for various textual expressions, according to some implementations of the current subject matter;

FIG. 3 illustrates an exemplary text table, according to some implementations of the current subject matter;

FIG. 4 illustrates an exemplary where-used reference table, according to some implementations of the current subject matter;

DETAILED DESCRIPTION

Figure 1:
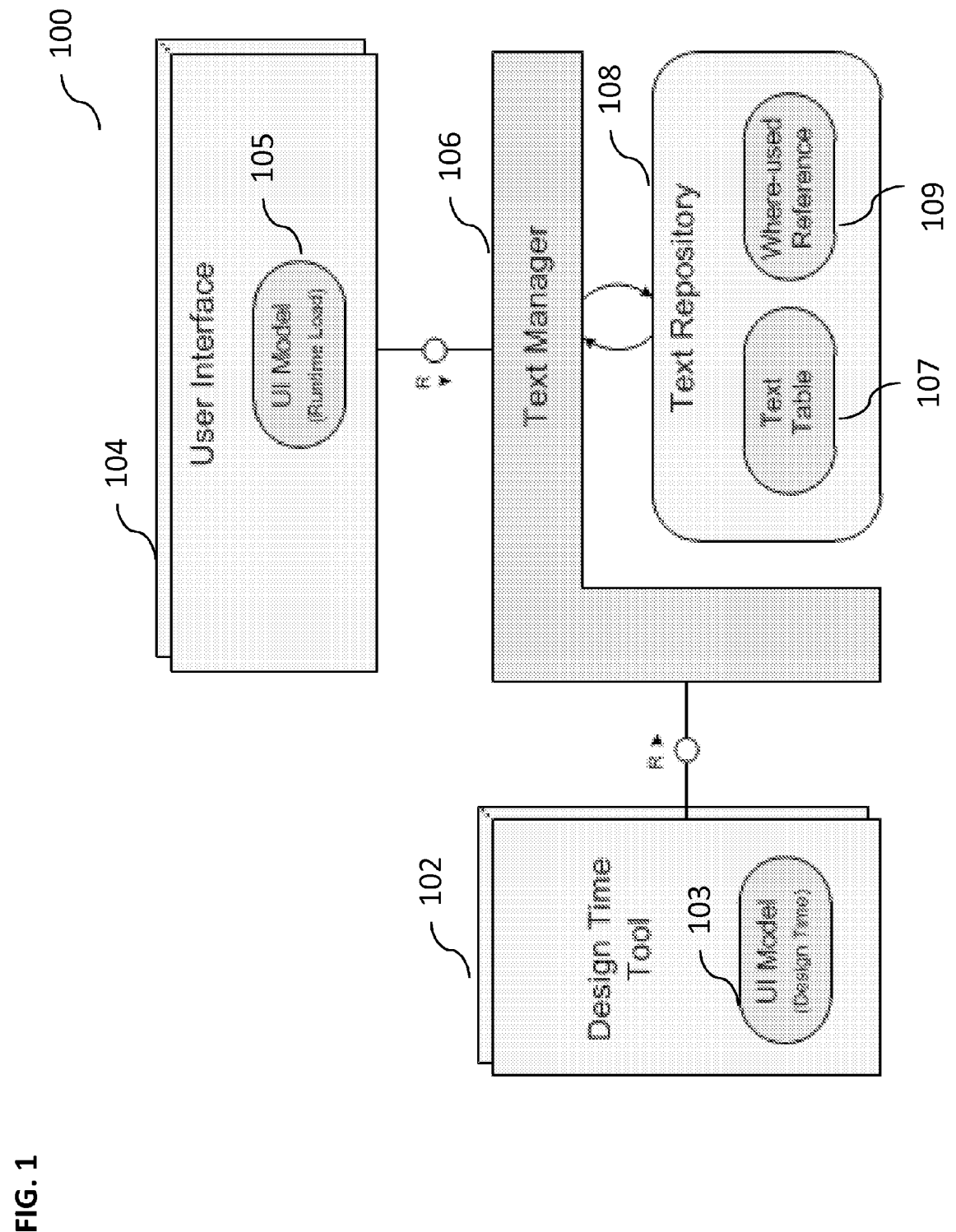
FIG. 1 illustrates an exemplary system for providing multi-language support in software applications, according to some implementations of the current subject matter.

To address the above-noted and potentially other deficiencies of currently available solutions, one or more implementations of the current subject matter provide methods, systems, articles or manufacture, and the like that can, among other possible advantages, provide systems and methods for providing systems, methods, and computer program products for providing multi-language support in software applications.

In some implementations, given the above issues with the conventional systems, the current subject matter provides an effective multi-language support for applications. Applications typically contain a variety of textual expressions (e.g., "File", "Save", etc.) that can be displayed to an end user. When the application is developed, a developer writes each textual expression in a default language and assigns a key value to it. The key value is generated using standard techniques (e.g., MD5 algorithm, SHA-1 algorithm, etc.). It is unique for each textual expression used in the application.

To ensure that end users are able to read application's textual expressions in users' native languages when they are displayed during runtime of the application, the keys for the textual expressions are mapped to a plurality of language codes (e.g., "EN" for English, "DE" for German) based on a particular locality (e.g., USA, Germany, etc.). The language codes correspond to the textual expressions being translated into multiple languages. For example, language code "EN" (i.e., English) corresponds to the textual expression "File", "DE" (i.e., "German") correspond to the textual expression "Datei", etc. The key value corresponding to the textual expression does not change regardless of the language that the textual expression is displayed in during runtime.

For each textual expression, the current subject matter system stores a table that includes a key value corresponding to the textual expression, language codes mapped to the key value, and the textual expression being written in different languages corresponding to the language codes (e.g., as shown in FIG. 3). During runtime of the application in a particular locality, the application uses the key value for an expression and a language code corresponding to the locality to retrieve the textual expression in the language that is understandable to the user. For example, the textual expression "Hello," may have a key 01 mapped to language code "ES" (i.e., Spanish) representing "Hola," and a language code DE (i.e., German) representing "Hallo." When the application is run in Spain, for example, the application displays "Hola" and if it is run in Germany, "Hallo" is displayed.

The current subject matter can store information where each textual expression is used in the application. This approach greatly reduces development time, alleviates a need to create separate textual expressions along with different key values for the same textual expressions in different languages, conserves storage space, expedites processing, and/or reduces costs.

Software applications typically contain a plurality of textual expressions that can be written in a default language (e.g., English) during design time. The textual expression can be used by different components of software application during runtime and can include letters, number, and/or any other characters. These textual expressions may need to be adapted to different languages corresponding to locations where the software application is used during runtime. The current subject matter can accomplish such application runtime adaptation by generating a key that corresponds to a particular textual expression. The key can be a hash value that can be uniquely determined based on the textual expression written in the default language. The key can be generated by a developer of the software application during design time. The key can be stored in a repository in a language table (or a plurality of language tables), where the language table contains a listing of the same textual expression being written in a plurality of different languages (including the default language) and identified using the generated key (as shown in FIG. 2). The repository can also include a location table (or a plurality of location tables) that identify where the textual expression is used in the software application. The language and location tables stored in the repository and can be used to identify a particular expression based on a generated key as well as the location where the textual expression is used and obtain that textual expression in a different language depending on the locale where the software application is running. The language table can allow identification of the textual expression in another language, while the location table determines where the expression is used, thereby allowing quicker retrieval of the appropriate language-based expression.

In some implementations, allocation and usage of language-dependent textual expression can be solved by an explicit allocation and usage of a unique language-independent identifier or a key that can be assigned to multiple development entities at design time. The corresponding language-dependent textual expressions can be located at runtime by using language-dependent resource files or text tables.

In some implementations, since software development systems use a default language (e.g., English) to develop their products, all language-dependent textual expressions that are used by a software development system can be stored in a text table. The text table can include a key that can be in form of a hash value corresponding to the textual expression. The hash value can be determined using a content of the textual expression written in the default language and can be unique to that textual expression. Some exemplary algorithms for determining a hash value of a textual expression can include a secure hash algorithm (e.g., SHA-1 algorithm), a message-digest algorithm (e.g., MD5 algorithm), and/or any other known algorithms.

For example, the SHA-1 algorithm can calculate a hash key having a length of 160 bits (or 20 bytes) of any content having a maximum length of $2^{64}-1$ bits. Similar to the SHA algorithm, the MD5 algorithm can calculate a 128-bit (or 16 bytes) long key which can be represented as a 32-digit hexadecimal number. For example, a text of "Once upon a midnight dreary, while I pondered, weak and weary" can correspond to an MD5 key of bc75a21f70378de565069a9433e54871, whereas a text of "Once upon a midnight dreary, while I pondered, weak and weary." (which includes a period at the end) can correspond to an MD5 key of 51cb35aa5b057ea635a54424b9d374d9. Thus, adding a period to the end of the text can result in a completely different MD5 key. FIG. 2 illustrates exemplary chart 200 containing MD5 keys corresponding to different textual expression that can be commonly found in software applications (e.g., "File", "Page Layout", "File not found", "Protect Document").

FIG. 1 illustrates an exemplary system 100 for providing multi-language support for software development systems, according to some implementations of the current subject matter. The system 100 can implement usage of the above keys to identify textual expressions in accordance with various language requirements. The system 100 can include a design time tool 102 that can implement a design time user interface model 103, a runtime user interface 104 which can implement a runtime user interface model 105, a text manager 106, and a text repository 108. The user interface models 103 and 105 are shown in FIG. 1 for exemplary and illustrative purposes only. The current subject matter system 100 can be used for any components of the software system either at design time and/or runtime.

During design time, a developer of a software application can use the design time tool(s) 102 to develop components of the software application (e.g., a user interface 104) based on a design time model (e.g., user interface design time model 103). As part of the development, the developer can enter various textual expressions corresponding to various components of the software application, e.g., a label, a push button, a menu item, a caption, a column title, etc. The design time tool 102 can store these textual expressions in the text repository 108. The storing can be accomplished automatically or based on an instruction entered by the developer of the application. The textual expression to be stored in the text repository 108 can be processed by the text manager 106 prior to being stored. Upon receiving of the textual expression from the design time tool 102, the text manager 106 can determine a key (a hash value) for the textual expression. The key can be determined using SHA, MD5 and/or any other known algorithms and/or any combinations thereof. Once the key is determined, the text manager 106 can pass the key to the text repository 108.

The text repository 108 can also pass the stored keys to the user interface model and runtime load 105, which can be associated with user interface component(s) corresponding to the textual expression that has been processed by the text manager 106 and stored in the repository 108. The user interface model and runtime load 105 can use the keys passed on to it by the text repository 108 to obtain any language dependent texts from the text repository 108.

The text repository 108 can include a text table 107 and a where-used reference table 109. An exemplary text table 107 is shown in FIG. 3 (as table 300) and an exemplary where-used reference table 109 is shown in FIG. 4 (as table 400).

Referring to FIG. 3, the table 300 includes various fields including a field for a key that has been determined (in this case, an MD5 hash value) for a textual expression "Sales Order", a LANG field that contains a standard language code (in accordance with the ISO 639 standard as developed by the International Organization for Standardization), and a text field that contains a string corresponding to the textual expression "Sales Order" as written in different languages in accordance with corresponding language codes. As shown in FIG. 3, the textual expressions having the same meaning, but written in different languages can correspond to the same key value. This same key value can be used to obtain different user interface components in different languages during runtime. As such, use of the table 300 can eliminate duplicate keys and/or duplicate content associated with the same component.

Referring to FIG. 4, the text repository 108 (not shown in FIG. 4) can also include the where-used reference table 400 that can indicate where in the software application (or, as shown in FIG. 1, in the user interface) a particular component associated with the textual expression or the textual expression is being used. The text repository 108 can be used along with the text manager 106 to obtain language-dependent textual expressions during runtime of applications. For example, an application using the word "FILE" can access the text manager 106, which in turn, accesses the repository 108 to ascertain what the corresponding textual expression in another language (e.g., German) can be. The repository can be a database that includes a correlation between various textual expressions as identified by their unique keys and language codes as well as locations where the textual expression can be used. Using the keys and language codes and locations where the textual expressions are used as stored in the repository 108, the text manager 106 can obtain textual expressions in different languages and provide it to the application during runtime of the application.

In some implementations, the table 400 contains various fields, which can include: a key field that includes a key (a hash value) that corresponds to a textual expression being used by a particular object and/or user interface component during runtime and identified in the table's object field; a type field that can describe the type of the development object (e.g., "UI" corresponding to a user interface; "AR" corresponding to analytical report); and an object field that can contain a unique name of the development object using the corresponding text managed by the key listed in the key field. As shown in FIG. 4, the same textual expression, as identified by the same key, corresponds to BUSINESS_OBJECT and UI_COMPONENT (user interface component) types and is being used by the SALES_ORDER object corresponding to the BUSINESS_OBJECT type and SALES_ORDER_OWL (sales order object work list), SALES_ORDER_OIF (sales order object instance floorplan), and SALES_ORDER_QAF (sales order quick activity floorplan) objects all corresponding to the UI_COMPONENT type. Based on the where-used entries in the table 400, the specific textual expression can be used in an existing development object.

In some implementations, the text manager 106 (shown in FIG. 1) can provide for lifecycle management of textual expressions associated with the software application. Such management can include at least one of the following: adding, updating, retrieving, and/or releasing language-dependent textual expressions, where-used references, translation infrastructures to maintain availability of different languages for use with the software application. The following illustrates some exemplary lifecycle management scenarios that can be performed by the text manager 106.

In some implementations, addition of a textual expression or string can be accomplished using the following exemplary code:

public static Hash TextManager.Add(String, Type, Object)

The above code can correspond to an operation of adding a string to the text repository 108 and returning a corresponding unique key. The unique key can be determined exclusively by the content of the string. In the above code, the "type" parameter can identify the component type that can use the string and the "object" parameter can include an identifier of the component. The identifier can be unique within the namespace of the component type. The type and object parameters can be used to create a where-used reference index for all textual expressions managed in the text repository 108.

In some implementations, the following exemplary code can be used to release a string in the text repository 108:

public static Boolean TextManager.Release(String, Type, Object)

public static Boolean TextManager.Release(Hash, Type, Object)

As stated above, this code can be used to release a string in the text repository 108. The code can return a "TRUE" Boolean value if there is no further usage of the string by other objects in the software application so that the string can be removed from the text repository 108. The code can return a "FALSE" Boolean value to indicate that there are still other objects that may be using the string. The string can be addressed via the text of the development language or via the corresponding hash key, as shown by the two variations of the code above.

In some implementations, the following exemplary code can be used to update a string in the text repository 108:

public static void TextManager.Update(String, String, Language)

public static void TextManager.Update(Hash, String, Language)

The above code can be used to update a string in the text repository 108 for a specific language. The string can be addressed via the text of the development language, as indicated by the first code line above, or via the corresponding hash key, as indicated by the second code line.

In some implementations, the following code can be used to retrieve a string from the text repository 108:

public static String TextManager.Retrieve(String, Language)

public static String TextManager.Retrieve(Hash, Language)

The above code can also be used to retrieve a string from the text repository 108 for a specific language. The string can be addressed via the text of the development language (e.g., a default language), as indicated by the first code line above, or via the corresponding hash key, as indicated by the second code line.

In some implementations, the following code can be used to perform various management operations with regard to the where-used reference table 109:

public static Index[Type, Object] TextManager.GetIndex (String, . . . )

public static Index[Type, Object] TextManager.GetIndex (Hash, . . . )

The above code can return a where-used reference index from the text repository 108 for a specific text. The index can be a collection of type-object pairs. The " . . . " in the code lines above can indicate that additional technical parameters can be included, for example, for sorting and/or paging of large indexes.

The current subject matter system 100 can be used for the purposes of common text management for various language-dependent texts. These can include business configuration code value texts, customer content, product and/or material descriptions, and/or any others. Among various advantages, the current subject matter's approach can reduce redundancy in creating duplicate entries for the same-meaning textual expressions and generation of multiple keys identifying the expressions, whereby a developer of a software application component that can require a human readable text (e.g., a user interface component) can provide the text in the development language without creating or maintaining any additional technical artifacts.

Figure 5:
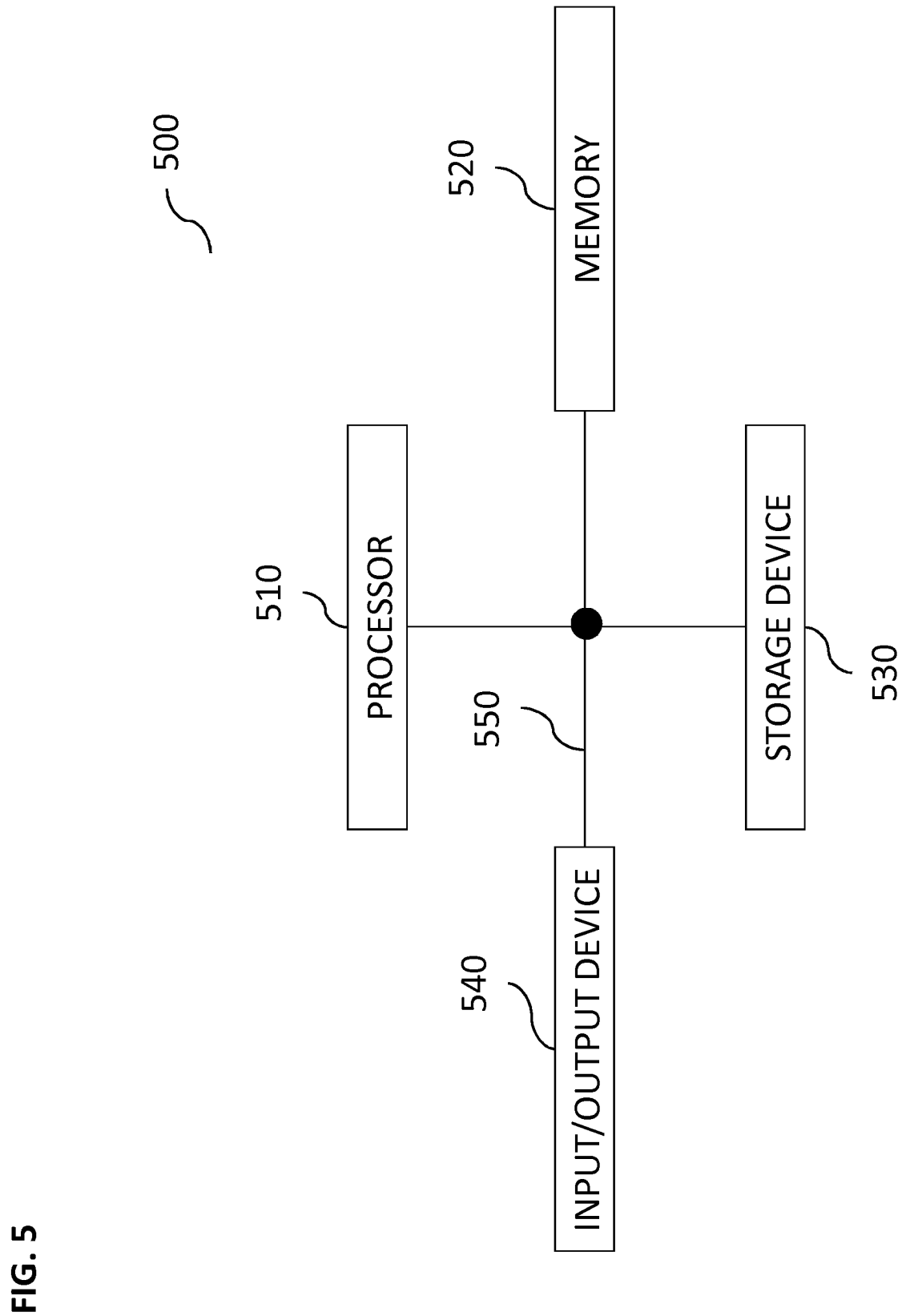
FIG. 5 illustrates an exemplary system, according to some implementations of the current subject matter.

In some implementations, the current subject matter can be configured to be implemented in a system 500, as shown in FIG. 5. The system 500 can include a processor 510, a memory 520, a storage device 530, and an input/output device 540. Each of the components 510, 520, 530 and 540 can be interconnected using a system bus 550. The processor 510 can be configured to process instructions for execution within the system 500. In some implementations, the processor 510 can be a single-threaded processor. In alternate implementations, the processor 510 can be a multi-threaded processor. The processor 510 can be further configured to process instructions stored in the memory 520 or on the storage device 530, including receiving or sending information through the input/output device 540. The memory 520 can store information within the system 500. In some implementations, the memory 520 can be a computer-readable medium. In alternate implementations, the memory 520 can be a volatile memory unit. In yet some implementations, the memory 520 can be a non-volatile memory unit. The storage device 530 can be capable of providing mass storage for the system 500. In some implementations, the storage device 530 can be a computer-readable medium. In alternate implementations, the storage device 530 can be a floppy disk device, a hard disk device, an optical disk device, a tape device, non-volatile solid state memory, or any other type of storage device. The input/output device 540 can be configured to provide input/output operations for the system 500. In some implementations, the input/output device 540 can include a keyboard and/or pointing device. In alternate implementations, the input/output device 540 can include a display unit for displaying graphical user interfaces.

Figure 6:
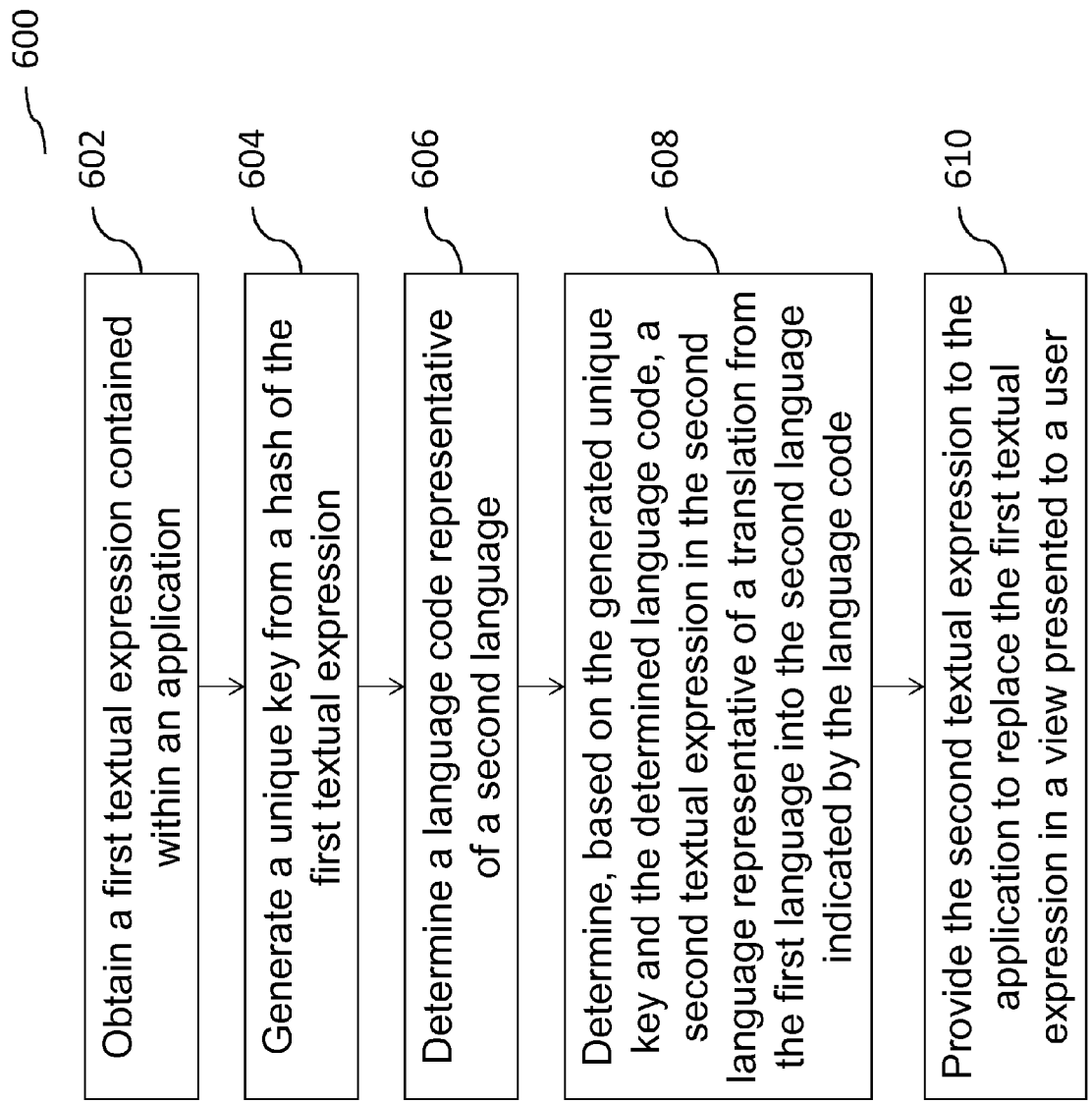
FIG. 6 illustrates an exemplary method, according to some implementations of the current subject matter.

FIG. 6 illustrates an exemplary method 600, according to some implementations of the current subject matter.

At 602, a first textual expression contained within an application can be obtained. The first textual expression is expressed in a first language (e.g., English). For example, as shown in FIG. 3, the textual expression can be "Sales Order" and can be expressed in English language, which is indicated by the language code "EN". Alternatively, the expression can be in any other language (e.g., Germany, French, Spanish, etc., as shown in FIG. 3).

At 604, a key corresponding to the obtained first textual expression can be generated. As shown in FIGS. 2-3, the key can be a hash key. For example, the hash key corresponding to the word "File" can be "0b27918290ff5323bea1e3b78a9cf04e" as shown in FIG. 2 and a hash key corresponding to the phrase "Sales Order" can be "d9b5aab07b3b540f791ba58667a18380", as shown in FIG. 3. The key can be determined by the text manager 106 (shown in FIG. 1), as discussed above.

At 606, a language code representative of a second language can be determined. For example, as shown in FIG. 3, the language codes can be "EN", "DE", "FR", "ES", etc.

At 608, a second textual expression in the second language representative of a translation from the first language into the second language indicated by the language code can be determined based on the generated unique key and the determined language code. Referring to FIG. 3, the textual expression corresponding to the phrase "Sales Order" in German language is "Verkaufsauftrag". The generated key, as shown in FIG. 3, is the same for English language textual expression as well as the German textual expression (i.e., "d9b5aab07b3b540f791ba58667a18380"). The same key is used to determine textual expression for "Sales Order" in French and Spanish languages. The key can also be used to determine corresponding textual expressions in other languages that are not shown in FIG. 3. A language code corresponding to the particular language in which the textual expression is desired can also be used along with the key (e.g., language code DE for German, FR for French, etc.). The text manager 106 (shown in FIG. 1) can access the text repository 108 (shown in FIG. 1) to obtain a corresponding textual expression in another language from the text table 107 (shown in FIG. 1), as discussed above.

At 610, the second textual expression can be provided to the application to replace the first textual expression in a view presented to a user.

In some implementations, the key can be a hash value stored in a repository. In some implementations, the repository can include a table containing a plurality of generated keys corresponding to a plurality of textual expressions in the software application and identifications of locations in the software application where each textual expression in the plurality of textual expressions is used by the software application.

In some implementations, the current subject matter can include one or more of the following optional features. The first textual expression can include information presented at a user interface. The determination of the language code can include determining a default language where the application is being executed, and selecting the language code representative of the default language. The determination of the second textual expression can include accessing a table including the generated unique key and the determined language code mapped to the second language expression. The method can also include generating a table including a plurality of unique keys mapped to language codes representing different translations of the first textual expression.

In some implementations, the method can also include accessing an index containing a location where the first textual expression appears in the application. The second textual expression can be placed in the location based on the accessed index. The method can also include updating the index with a new location where the first textual expression is used by the application, and placing the second textual expression in the new location based on the updated index.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method comprising:
   obtaining a first textual expression contained within an application, wherein the first textual expression is expressed in a first language;
   generating a unique key from a hash of the first textual expression, the unique key being generated based on a location of where the first textual expression is used within the application and a type of object of the application using the first textual expression;
   determining a language code representative of a second language, the language code being associated with the unique key;
   determining, based on the generated unique key and the determined language code, a second textual expression in the second language representative of a translation from the first language into the second language indicated by the language code; and
   providing, based on the location and the type of object, the second textual expression to the application to replace the first textual expression in a view presented to a user.

2. The method according to claim 1, wherein the first textual expression comprises information presented at a user interface.

3. The method according to claim 1, wherein the determining the language code further comprises:
   determining a default language where the application is being executed; and
   selecting the language code representative of the default language.

4. The method according to claim 1, wherein the determining the second textual expression further comprises:
   accessing a table including the generated unique key and the determined language code mapped to the second language expression.

5. The method according to claim 4, further comprising:
   generating a table including a plurality of unique keys mapped to language codes representing different translations of the first textual expression.

6. The method according to claim 1, further comprising accessing an index containing a location where the first textual expression appears in the application.

7. The method according to claim 6, wherein the providing further comprises:
   placing the second textual expression in the location based on the accessed index.

8. The method according to claim 6, further comprising updating the index with a new location where the first textual expression is used by the application; and
   placing the second textual expression in the new location based on the updated index.

9. A computer-program product comprising a non-transitory machine-readable medium storing instructions that, when executed by at least one programmable processor, cause the at least one programmable processor to perform operations comprising:
   obtaining a first textual expression contained within an application, wherein the first textual expression is expressed in a first language;
   generating a unique key from a hash of the first textual expression, the unique key being generated based on a location of where the first textual expression is used within the application and a type of object of the application using the first textual expression;
   determining a language code representative of a second language, the language code being associated with the unique key;
   determining, based on the generated unique key and the determined language code, a second textual expression in the second language representative of a translation from the first language into the second language indicated by the language code; and
   providing, based on the location and the type of object, the second textual expression to the application to replace the first textual expression in a view presented to a user.

10. The computer-program product according to claim 9, wherein the first textual expression comprises information presented at a user interface.

11. The computer-program product according to claim 9, wherein the determining the language code further comprises:
    determining a default language where the application is being executed; and
    selecting the language code representative of the default language.

12. The computer-program product according to claim 9, wherein the determining the second textual expression further comprises:
    accessing a table including the generated unique key and the determined language code mapped to the second language expression.

13. The computer-program product according to claim 12, wherein the operations further comprise
    generating a table including a plurality of unique keys mapped to language codes representing different translations of the first textual expression.

14. The computer-program product according to claim 9, wherein the operations further comprise
    accessing an index containing a location where the first textual expression appears in the application.

15. The computer-program product according to claim 14, wherein the providing further comprises:
    placing the second textual expression in the location based on the accessed index.

16. The computer-program product according to claim 14, wherein the operations further comprise
    updating the index with a new location where the first textual expression is used by the application; and
    placing the second textual expression in the new location based on the updated index.

17. A system comprising:
    at least one programmable processor; and
    a machine-readable medium storing instructions that, when executed by the at least one programmable processor, cause the at least one programmable processor to perform operations comprising:
    obtaining a first textual expression contained within an application, wherein the first textual expression is expressed in a first language;
    generating a unique key from a hash of the first textual expression, the unique key being generated based on a location of where the first textual expression is used within the application and a type of object of the application using the first textual expression;
    determining a language code representative of a second language, the language code being associated with the unique key;
    determining, based on the generated unique key and the determined language code, a second textual expression in the second language representative of a translation from the first language into the second language indicated by the language code; and providing, based on the location and the type of object, the second textual expression to the application to replace the first textual expression in a view presented to a user.

18. The system according to claim 17, wherein the first textual expression comprises information presented at a user interface.

19. The system according to claim 17, wherein the determining the language code further comprises:
   determining a default language where the application is being executed; and
   selecting the language code representative of the default language.

20. The system according to claim 17, wherein the determining the second textual expression further comprises:
   accessing a table including the generated unique key and the determined language code mapped to the second language expression.

* * * * *